United States Patent
Santy et al.

(10) Patent No.: US 8,770,442 B2
(45) Date of Patent: Jul. 8, 2014

(54) O-RING RETAINER FOR VALVE STEM

(75) Inventors: David Santy, Converse, TX (US); A. A. Jud Schroeder, San Antonio, TX (US)

(73) Assignee: Schroeder Industries, Inc., San Antonio, TX (US)

( * ) Notice: Subject to any disclaimer, the term of this patent is extended or adjusted under 35 U.S.C. 154(b) by 235 days.

(21) Appl. No.: 13/108,118

(22) Filed: May 16, 2011

(65) Prior Publication Data
US 2011/0297699 A1  Dec. 8, 2011

Related U.S. Application Data

(60) Provisional application No. 61/351,556, filed on Jun. 4, 2010.

(51) Int. Cl.
*B67D 7/06*  (2010.01)
*F16K 1/00*  (2006.01)

(52) U.S. Cl.
USPC .......... 222/144.5; 251/321; 251/246; 251/363

(58) Field of Classification Search
USPC ............ 222/144.5, 132, 129.1; 251/246, 321, 251/363, 330, 214
See application file for complete search history.

(56) References Cited

U.S. PATENT DOCUMENTS

| | | | |
|---|---|---|---|
| 1,627,147 A | 5/1927 | Clark | |
| 1,947,329 A | 2/1934 | Buttner | |
| 2,478,586 A | 8/1949 | Krapp | |
| 2,682,386 A | 6/1954 | Lindsay | |
| 2,887,250 A | 5/1959 | Zilk | |
| 2,937,792 A | 5/1960 | Firstenberg | |
| 3,009,653 A | 11/1961 | Hedeman | |
| 3,013,701 A | 12/1961 | Joschko | |
| 3,108,779 A | 10/1963 | Anderson | |
| 3,168,967 A * | 2/1965 | Giampa | 222/129.1 |
| 3,326,520 A | 6/1967 | Guenther | |
| 3,619,668 A | 11/1971 | Pinckaers | |

(Continued)

FOREIGN PATENT DOCUMENTS

| | | |
|---|---|---|
| GB | 1 300 072 | 12/1972 |
| WO | WO 02/090241 | 11/2002 |

(Continued)

OTHER PUBLICATIONS

Wunder-Bar Food & Beverage Dispensing Systems, Post-Mix Beverage Dispenser, Automatic Bar Controls, Inc., Rev. 120508.

*Primary Examiner* — Paul R Durand
*Assistant Examiner* — Charles P Cheyney
(74) *Attorney, Agent, or Firm* — Jackson Walker, LLP

(57) ABSTRACT

An O-ring retainer is disclosed that is integral with a valve stem of a valve. The valve is intended to move in a valve chamber, which valve chamber has a fluid inlet and a fluid outlet. When manually actuated, the valve moves between a first position, where it is seated against walls of the valve chamber and prevents flow through the chamber, and a second unseated position where it allows flow of the fluid through the chamber between the inlet and the outlet. An O-ring, used in conjunction with the valve and the valve chamber, is maintained in place by an outward projection from the valve stem, which projection is located just below the normally seated O-ring. Thus, if the O-ring becomes unseated, the projection, upon movement of the valve towards the seated position, bumps the O-ring back into its normal position.

22 Claims, 2 Drawing Sheets

(56) References Cited

U.S. PATENT DOCUMENTS

| | | | |
|---|---|---|---|
| 3,643,754 | A | 2/1972 | Brandin et al. |
| 3,867,962 | A | 2/1975 | Gerrard |
| 3,963,317 | A | 6/1976 | Eignbrode et al. |
| 4,084,783 | A * | 4/1978 | Wrasman ............ 249/175 |
| 4,098,295 | A | 7/1978 | Haytayan |
| 4,196,886 | A | 4/1980 | Murray |
| 4,219,046 | A | 8/1980 | West et al. |
| 4,356,997 | A * | 11/1982 | Beffano ............ 251/214 |
| 4,390,224 | A | 6/1983 | Showman et al. |
| 4,433,795 | A | 2/1984 | Maiefski et al. |
| 4,469,389 | A | 9/1984 | Grabbe et al. |
| 4,497,421 | A * | 2/1985 | Schilling ............ 222/144.5 |
| 4,519,635 | A | 5/1985 | McMath |
| 4,619,378 | A | 10/1986 | de Man |
| 4,635,824 | A | 1/1987 | Gaunt et al. |
| 4,637,527 | A | 1/1987 | Arrigoni |
| 4,677,774 | A * | 7/1987 | Macchi ............ 38/77.83 |
| 4,732,300 | A * | 3/1988 | Valiyee et al. ............ 222/144.5 |
| 4,821,921 | A | 4/1989 | Cartwright et al. |
| 4,887,740 | A * | 12/1989 | Smith ............ 222/129.1 |
| 4,921,140 | A | 5/1990 | Belcham |
| D309,232 | S | 7/1990 | Vallyee et al. |
| 4,986,449 | A * | 1/1991 | Valiyee et al. ............ 222/144.5 |
| 5,033,648 | A | 7/1991 | Nakayama et al. |
| 5,042,692 | A | 8/1991 | Vallyee et al. |
| 5,305,924 | A | 4/1994 | Groover et al. |
| 5,524,452 | A | 6/1996 | Hassell et al. |
| 5,649,431 | A | 7/1997 | Schroeder et al. |
| 5,873,259 | A | 2/1999 | Spillman |
| 6,112,946 | A | 9/2000 | Bennett et al. |
| 6,196,422 | B1 | 3/2001 | Tuyls et al. |
| 6,260,477 | B1 | 7/2001 | Tuyls et al. |
| 6,269,973 | B1 | 8/2001 | Bennett et al. |
| 6,283,155 | B1 | 9/2001 | Vu |
| 6,322,051 | B1 * | 11/2001 | Salmela ............ 251/321 |
| 6,328,181 | B1 | 12/2001 | Schroeder et al. |
| 6,405,897 | B1 | 6/2002 | Jepson et al. |
| 6,463,753 | B1 | 10/2002 | Haskayne |
| 6,626,005 | B2 | 9/2003 | Schroeder |
| 6,644,508 | B2 | 11/2003 | Haskayne |
| 6,672,849 | B1 | 1/2004 | Martindale et al. |
| 6,698,229 | B2 | 3/2004 | Renken |
| 6,722,527 | B1 | 4/2004 | Krauss |
| 6,725,687 | B2 | 4/2004 | McCann et al. |
| 6,761,036 | B2 | 7/2004 | Teague |
| 6,832,487 | B1 | 12/2004 | Baker |
| 6,945,070 | B1 | 9/2005 | Jablonski |
| 7,025,230 | B1 | 4/2006 | Salmela |
| 7,028,864 | B2 * | 4/2006 | McCann et al. ............ 222/144.5 |
| 7,048,148 | B2 | 5/2006 | Roekens |
| 7,080,937 | B1 | 7/2006 | Salmela et al. |
| 7,232,044 | B1 | 6/2007 | Salmela |
| D549,021 | S | 8/2007 | Tuyls et al. |
| 7,266,974 | B2 | 9/2007 | Schroeder |
| 7,305,847 | B2 | 12/2007 | Wolski |
| 7,337,618 | B2 | 3/2008 | Wolski |
| 7,337,627 | B2 | 3/2008 | Wolski |
| 7,373,784 | B2 | 5/2008 | Haskayne |
| 7,384,073 | B1 | 6/2008 | Tuyls et al. |
| 7,448,418 | B1 | 11/2008 | Tuyls |
| 7,762,431 | B1 | 7/2010 | Tuyls et al. |
| D626,373 | S | 11/2010 | Valiyee et al. |
| D626,374 | S | 11/2010 | Valiyee et al. |
| D626,375 | S | 11/2010 | Valiyee et al. |
| D628,014 | S | 11/2010 | Martindale |
| 7,931,382 | B2 | 4/2011 | Hecht |
| D638,659 | S | 5/2011 | Martindale et al. |
| D643,708 | S | 8/2011 | Hecht |
| D647,785 | S | 11/2011 | Hecht |
| D648,420 | S | 11/2011 | Hecht |
| D648,421 | S | 11/2011 | Hecht |
| D648,617 | S | 11/2011 | Hecht |
| D648,826 | S | 11/2011 | Hecht |
| 2001/0030308 | A1 | 10/2001 | Schroeder |
| 2003/0071060 | A1 | 4/2003 | Haskayne |
| 2006/0162370 | A1 | 7/2006 | Haskayne |
| 2007/0272152 | A1 * | 11/2007 | Rogers ............ 118/710 |
| 2008/0135426 | A1 | 6/2008 | Hecht et al. |
| 2008/0217357 | A1 | 9/2008 | Hecht |
| 2008/0223876 | A1 * | 9/2008 | Schroeder ............ 222/144.5 |
| 2009/0078722 | A1 | 3/2009 | Salmela |
| 2009/0090747 | A1 | 4/2009 | Tuyls et al. |
| 2009/0145927 | A1 * | 6/2009 | Salmela et al. ............ 222/144.5 |
| 2009/0230148 | A1 | 9/2009 | Valiyee et al. |
| 2010/0097881 | A1 | 4/2010 | Tuyls et al. |
| 2010/0116842 | A1 | 5/2010 | Hecht et al. |
| 2010/0147886 | A1 | 6/2010 | Martindale |
| 2010/0314411 | A1 | 12/2010 | Tuyls et al. |
| 2011/0057134 | A1 | 3/2011 | Martindale et al. |
| 2011/0073617 | A1 | 3/2011 | Martindale et al. |
| 2011/0286883 | A1 | 11/2011 | Hecht et al. |
| 2011/0315711 | A1 | 12/2011 | Hecht et al. |

FOREIGN PATENT DOCUMENTS

| | | |
|---|---|---|
| WO | WO 03/024862 | 3/2003 |
| WO | WO 2006/088990 | 8/2006 |
| WO | WO 2009/090429 | 7/2009 |

* cited by examiner

O-RING RETAINER FOR VALVE STEM

This patent application claims the benefit of U.S. provisional patent application Ser. No. 61/351,556, filed Jun. 4, 2010.

FIELD OF THE INVENTION

Bar gun handles; more specifically, a poppet valve having an O-ring retainer thereon.

BACKGROUND OF THE INVENTION

Bar guns assemblies are used to selectively receive a multiplicity of different flavored syrups from a multiplicity of pressurized sources and to mix the syrup with soda water and dispense the resulting beverage into a container. Buttons on the bar gun actuate pistons in piston chambers which, when unseated, will allow fluid to flow through the chambers to the nozzle for mixing and dispensing. Undesirable leakage has occurred from the piston chambers.

SUMMARY OF THE INVENTION

A poppet valve member in a bar gun handle having a stem dimensioned with a retainer to move a displaced O-ring to a normal, seated position.

An O-ring retainer is disclosed that is integral with a valve stem of a valve. The valve is intended to move in a valve chamber, which valve chamber has a fluid inlet and a fluid outlet. When manually actuated, the valve moves between a first position, where it is seated against walls of the valve chamber and prevents flow through the chamber, and a second unseated position where it allows flow of the fluid through the chamber between the inlet and the outlet. An O-ring, used in conjunction with the valve and the valve chamber, is maintained in place by an outward projection from the valve stem, which projection is located just below the normally seated O-ring. Thus, if the O-ring becomes unseated, the projection, upon movement of the valve towards the seated position, bumps the O-ring back into its normal position.

A bar gun assembly for receiving a multiplicity of fluid carrying tubes carrying pressurized fluids, the bar gun assembly is disclosed. A handle is adapted to receive a multiplicity of fluids thereinto in a multiplicity of inlet ports. The handle includes a multiplicity of fluid channels having a multiplicity of generally cylindrical fluid chambers, each fluid chamber having an inlet and an outlet port, stem guide walls, cylindrical valve stem chamber side walls and end walls, valve body walls, and valve seat. The valve seat is located between the inlet and outlet fluid ports. A multiplicity of valve members each have a valve stem and a valve body. The valve stem has a removed end. The valve members are configured to engage the fluid chambers and are moveable between a first position wherein the valve body is urged against the valve seat and prevents fluid flow between the ports and a second position wherein the valve body is spaced apart from the valve seat and fluid may flow between the ports.

An O-ring having outer walls is provided, the O-ring adapted to engage in a normal configuration, the valve stem chamber side walls and the valve stem chamber end walls. The O-ring substantially prevents the flow of fluid therepast regardless of the position of the valve members.

The valve stem includes an O-ring retainer moveable therewith. The O-ring retainer is located between the removed end of the valve stem and the valve body. The O-ring retainer is positioned between the closer of the inlet or outlet port and the removed end of the valve stem. The O-ring retainer has a disk projection, finger projections or other suitable structure engaging the valve stem. The O-ring retainer leaves a small gap between its top surface and the O-ring when the O-ring is normally seated and the valve member is in the first position.

DETAILED DESCRIPTION OF THE PREFERRED EMBODIMENT

This application incorporates by reference U.S. patent application Ser. No. 12/286,441, Publication No. US/2009/0084817. FIG. 1A illustrates a typical bar assembly 100 with a multiplicity of fluid carrying tubes 110 (ghosted).

Figure 1:
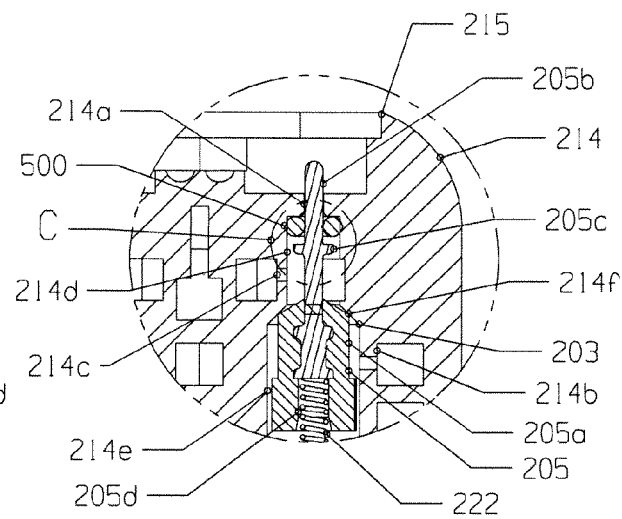
FIG. 1 is a cross-sectional view of a bar gun showing a portion of the poppet valve as it rests in a normal position in the bar gun.
Figure 1A:
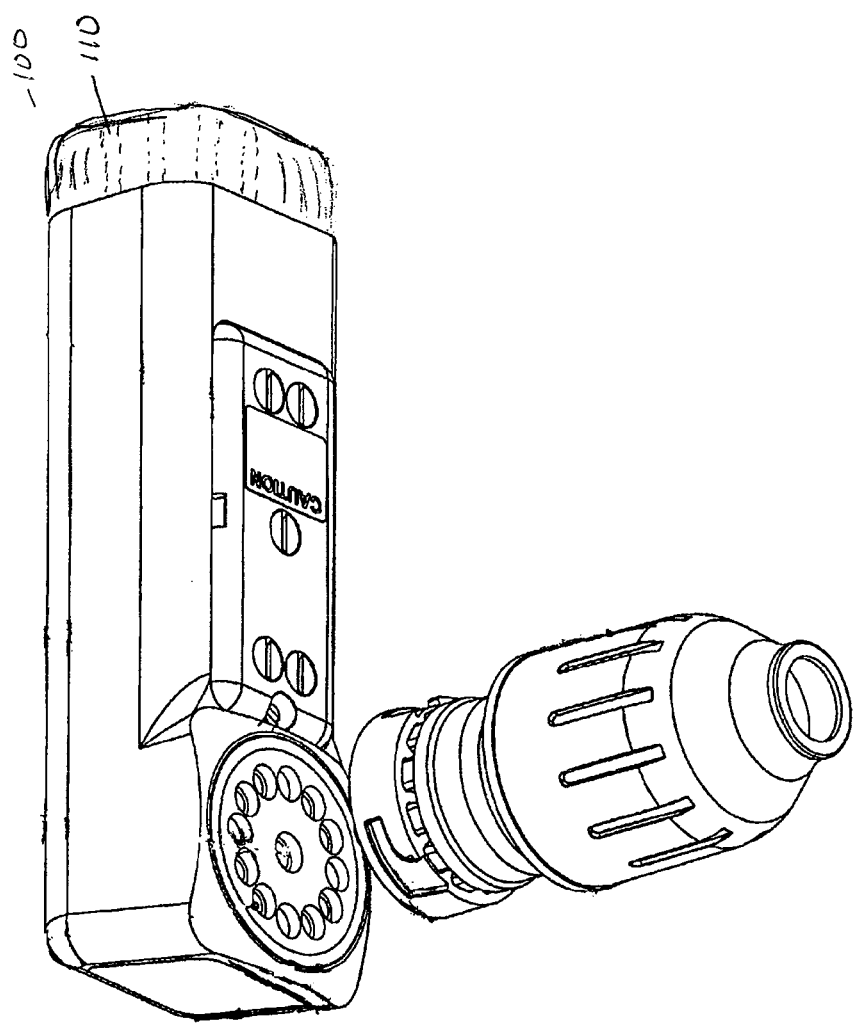
FIG. 1A is a perspective exploded view of a typical bar gun.

FIG. 1 illustrates a cross-sectional view of a portion of a bar gun body 214 having a valve member 205 engaged to and designed to fit in chamber 203.

More specifically, it is seen that valve member 205 is engaged to body 214 such that valve body 205a is substantially contained within valve body chamber walls 214e. Valve member 205 when normally closed urges valve body 205a against seat 214f of chamber 203. The valve body 205a may be at least partly resilient, where it meets seat 214f. Valve member 205 has a valve stem 205b. Valve stem 205b extends through a stem chamber defined by stem chamber walls 214d and extends through and out of stem guide walls 214a. A button from a multiplicity of buttons of a button assembly 215 will engage the removed end of valve stem 205b in ways known in the art. A spring 222 will engage a spring cavity 205d, to urge valve member 205 to a normally closed, seated position (see FIG. 1).

Chamber 203 includes body walls, including those defining stem guide walls 214a, a first body port 214b for allowing fluid to enter or leave chamber 203, and a second body port 214c for allowing fluid to either enter or leave chamber 203. With spring 222 normally urging valve member 205 to a closed position as seen in FIG. 1, no fluid can flow between body ports 214b/214c. But upon depression of a button acting on the removed end of stem 205b and pushing it downward as seen in FIG. 1, then fluid under pressure can move between the two ports 214b/214c in ways known in the art. O-ring 500 engages snugly and in a fluid sealing manner a portion of stem 205b and also snugly contacts stem chamber walls 214e normally seated in the position seen in FIG. 1.

Under normal operation, valve member 205 is depressed to allow fluid under pressure to flow between the body ports and out a nozzle for dispensing into a cup as a beverage. The function of O-ring 500, as known in the art, is to prevent fluid under pressure in chamber 203 to leak out any space between stem guide walls 214a and that portion of stem 205d adjacent the walls typically when the valve member is depressed.

In operation, it is found that sometimes, after one or more cycles of depressing and releasing of the poppet valve, that O-ring 500 can slide down or get cocked at an angle from the normal seated position seen in FIG. 1. It may be that contact between the O-ring and the valve stem when the stem moves down may "drag" the O-ring out of position. That position, the normal seated position for O-ring in FIG. 1, is to lie adjacent the end walls of the stem chamber walls 214*d*. However, if O-ring 500 gets cocked at an angle as a result of one or more actuations of the valve member, then there may be some leakage of fluid past the O-ring and up and out stem guide walls 214*a*. To prevent such an occurrence, that is, the O-ring from either migrating downward from the position as seen in FIG. 1 or getting cocked at an angle, Applicants provide structure on, integral with, or added to stem 205*b*, such structure in the nature of a land or other typically disc-shaped member, here set forth as O-ring retainer 205*c*.

O-ring retainer 205*c*, being directly engaged with the stem, either made integral therewith or affixed thereto, will ride up and down as part of valve member 205 during the operation thereof. It has been found that in operation, O-ring retainer 205*c* is able, when the valve moves to its normal position (ports sealed) as seen in FIG. 1, that it will act on misaligned O-ring to urge it back to its normal position. The O-ring normal position is typically snug against the valve stem, the cylindrical valve stem chamber side walls and the valve stem chamber end walls.

Figure 3:
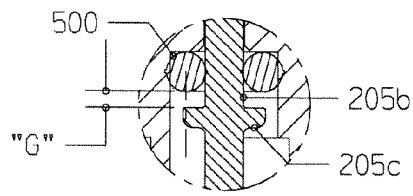
FIG. 3 is a detailed view of Detail C as set forth in FIG. 1.

As seen in FIG. 3, a gap may be provided between the upper surface of the retainer 205*c* and the lower surface of the O-ring 500 of about 0.020-0.030 inches, preferably about 0.023 inch or any suitable distance. This allows for some compression of the valve against the valve seat and keeps retainer 205*c* from contacting O-ring 500 when the O-ring is normally seated, and normal tolerances will assure that the top surface of O-ring retainer 205*c* will not compress or seat against the bottom of the O-ring 500 when it is up against the valve stem chamber end walls (which will prevent the piston from seating).

Preferably, the preferred O-ring 500 is not made from or based on silicon. EPDM is one suitable O-ring material. The retainer may be made integral to the valve stem by press fitting a separately made retainer tightly onto the valve stem. A stainless steel valve stem may be machined on suitable machinery with the retainer machined thereon. Either press fit, machined or otherwise, the retainer is integral, meaning moves with the valve stem.

Figure 4:
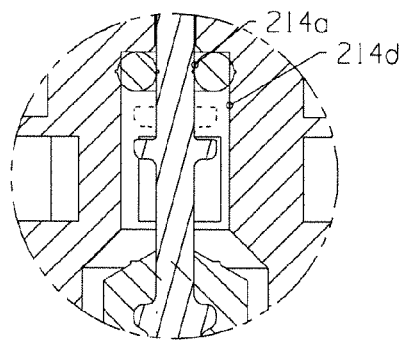
FIG. 4 is a cross-sectional plan view of the valve member in a first (ghosted) and a second position and showing a normally seated O-ring.
Figure 2:
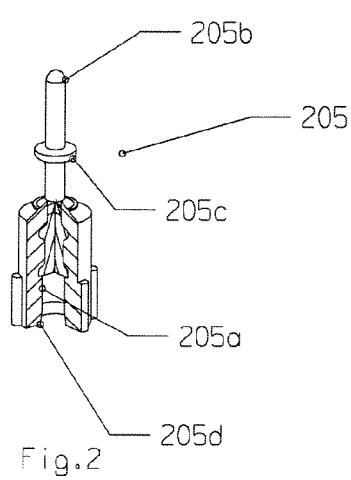
FIG. 2 is a cutaway section of the valve member removed from the bar gun showing the unique O-ring retainer on the stem thereof.

FIG. 4 shows the travel of the O-ring retainer 205*c* between the two positions of the valve (seated and unseated) and how the retainer moves with the valve as part of the valve stem. The O-ring is shown in its normal position.

Figure 5:
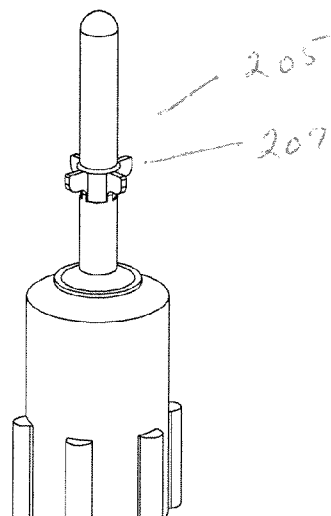
FIG. 5 is a detail side perspective view of an alternate embodiment of the O-ring retainer.

FIG. 5 illustrates an alternate embodiment of an O-ring retainer having a multiplicity of discreet fingers 207 extending generally perpendicular to the stem walls.

Although the invention has been described in connection with the preferred embodiment, it is not intended to limit the invention's particular form set forth, but on the contrary, it is intended to cover such alterations, modifications, and equivalences that may be included in the spirit and scope of the invention as defined by the appended claims.

The invention claimed is:

1. A bar gun assembly for receiving a multiplicity of fluid carrying tubes carrying pressurized fluid, the bar gun assembly comprising:
    a handle adapted to receive a multiplicity of fluids in a multiplicity of inlet ports, the handle including a multiplicity of fluid channels having a multiplicity of cylindrical fluid chambers, the fluid chambers having an inlet and an outlet port, cylindrical valve stem chamber walls, including valve stem chamber side walls and end walls, stem guide walls, valve body walls, and valve seats, the valve seats located between the inlet and outlet fluid ports;
    a multiplicity of valve members each having a valve stem and a valve body, the valve stem having a removed end, the valve members configured to move as a unit and to engage the fluid chambers of the handle and to longitudinally move between a first position wherein the valve body is urged against the valve seat and prevents fluid flow between the ports and a second position wherein the valve body is longitudinally spaced apart from the valve seat and permits flow between the ports;
    an O-ring adapted to engage the fluid chamber walls and the valve stem to substantially prevent the flow of fluid therepast regardless of the position of the valve members; and
        wherein the valve stem includes an O-ring retainer to move longitudinally with the valve stem and valve body; and
        wherein the O-ring retainer leaves a gap between itself and the O-ring when the valve member is in the first position.

2. The bar gun assembly of claim 1, wherein the valve stem has a longitudinal axis and the O-ring retainer projects laterally outward therefrom and wherein O-ring retainer is located between the removed end of the valve stem and the valve body and such that the O-ring is between the O-ring retainer and the valve stem chamber end walls.

3. The bar gun assembly at claim 1, wherein the O-ring retainer is located between a closer of the inlet or outlet port when the valve member is in the first position and the removed end of the valve stem and such that the O-ring is between the O-ring retainer and the valve stem chamber end walls.

4. The bar gun assembly at claim 1, wherein the valve stem comprises an elongated cylindrical member and wherein the O-ring retainer is a disk-shaped projection and such that the O-ring is between the O-ring retainer and the valve stem chamber end walls.

5. The bar gun assembly of claim 1, wherein the O-ring retainer includes a top surface, bottom surface, and perimeter and such that the O-ring is between the O-ring retainer and the valve stem chamber end walls.

6. The bar gun assembly of claim 1, wherein the valve stem comprises a longitudinal cylindrical member and wherein the O-ring retainer includes multiple fingers and such that the O-ring is between the O-ring retainer and the valve stem chamber end walls.

7. The bar gun assembly of claim 1, wherein the O-ring retainer has outer perimeter walls, which walls visibly terminate before reaching the walls of the fluid chamber and such that the O-ring is between the O-ring retainer and the valve stem chamber end walls.

8. The bar gun assembly of claim 1, wherein the O-ring retainer is located between the removed end of the valve stem and the valve body, wherein the O-ring retainer is located between a closer of the inlet or outlet port and the removed end of the valve stem when the valve member is in the first position, and wherein the O-ring retainer has outer perimeter walls, which walls terminate before reaching the walls of the fluid chamber.

9. The bar gun assembly of claim 8, wherein the O-ring retainer leaves a gap between itself and the O-ring when the O-ring is seated adjacent the valve stem chamber end walls and the valve member is in the first position.

10. The bar gun assembly of claim 8, wherein the valve stem comprises an elongated cylindrical member and wherein the O-ring retainer is a disk-shaped projection.

11. The bar gun assembly of claim 10, wherein the O-ring retainer leaves a gap between itself and the O-ring when the O-ring is seated adjacent the valve stem chamber end walls and the valve member is in the first position.

12. The bar gun assembly of claim 8, wherein the O-ring retainer includes multiple fingers.

13. The bar gun assembly of claim 12, wherein the O-ring retainer leaves a gap when the O-ring is seated adjacent the valve stem chamber end walls and the valve member is in the first position.

14. The bar gun assembly of claim 1, wherein the O-ring retainer is located between the removed end of the valve stem and the valve body, wherein the O-ring retainer is located between a closer of the inlet or outlet port and the removed end of the valve stem when the valve member is in the first position, wherein the O-ring retainer has perimeter walls, which walls terminate before reaching the walls of the fluid chamber; and wherein the O-ring retainer leaves a gap when the O-ring is seated adjacent the valve stem chamber end walls and the valve member is in the first position.

15. A bar gun assembly for receiving a multiplicity of fluid carrying tubes carrying pressurized fluids, the bar gun assembly comprising:
    a handle adapted to receive a multiplicity of fluids in a multiplicity of inlet ports, the handle including a multiplicity of fluid channels having a multiplicity of generally cylindrical fluid chambers, each fluid chamber having an inlet and an outlet port, cylindrical valve stem chamber side walls and end walls, stem guide walls, valve body walls, and a valve seat, the valve seat located between the inlet and the outlet ports;
    a multiplicity of valve members each having a valve stem and a valve body, the valve stem having a removed end, the valve members configured to move as a unit and to engage the fluid chambers of the handle to move between a first position wherein the valve body is urged against the valve seat and prevents fluid flow between the ports and a second position wherein the valve body is longitudinally spaced apart from the valve seat and permits flow between the ports;
    an O-ring having outer walls, the O-ring adapted to engage in a normal position, the valve stem chamber side walls and the valve stem chamber end walls, the O-ring to substantially prevent the flow of fluid therepast regardless of the position of the valve member;
        wherein the valve stem includes an O-ring retainer to move longitudinally with the valve stem and body;
        wherein the O-ring retainer is located between the removed end of the valve stem and the valve body;
        wherein the O-ring retainer is located between a closer of the inlet or outlet port and the removed end of the valve stem when the valve member is in the first position;
        wherein the O-ring retainer is a substantially disk-shaped projection integral with the valve stem, including a top surface, bottom surface, and perimeter; and
        wherein the O-ring retainer leaves a small gap between the top surface thereof
    and the O-ring when the O-ring is seated adjacent the valve stem chamber end walls and the valve member is in the first position.

16. The bar gun assembly of claim 15, wherein the O-ring is made of a suitable pliable material other than one containing silicon.

17. The bar gun assembly of claim 15, wherein the gap is between about 20 and 30 mil.

18. A bar gun assembly for receiving a multiplicity of fluid carrying tubes carrying pressurized fluids, the bar gun assembly comprising:
    a handle adapted to receive a multiplicity of fluids in a multiplicity of inlet ports, the handle including a multiplicity of fluid channels having a multiplicity of generally cylindrical fluid chambers, each fluid chamber having an inlet and an outlet port, cylindrical valve stem chamber side walls and end walls, stem guide walls, valve body walls, and a valve seat, the valve seat located between the inlet and the outlet ports;
    a multiplicity of valve members each having a valve stem and a valve body, the valve stem having a removed end, the valve members configured to move as a unit and to engage the fluid chambers of the handle and moveable between a first position wherein the valve body is urged against the valve seat and prevents fluid flow between the ports and a second position wherein the valve body is longitudinally spaced apart from the valve seat and permits flow between the ports;
    an O-ring having outer walls, the O-ring adapted to engage in a normal position, the valve stem chamber side walls and the valve stem chamber end walls, the O-ring to prevent the flow of fluid therepast regardless of the position of the valve member;
        wherein the valve stem includes an O-ring retainer moveable longitudinally with the valve stem and body;
        wherein the O-ring retainer is located between a removed end of the valve stem and the valve body when the valve member is in the first position;
        wherein the O-ring retainer is located between the closer of the inlet or outlet port and the removed end of the valve stem;
        wherein the O-ring retainer has finger projections engaging the valve stem; and
        wherein the O-ring retainer leaves a small gap between itself and the O-ring
    when the O-ring is seated adjacent the valve stem chamber end walls and the valve member is in the first position.

19. A bar gun assembly for receiving a multiplicity of fluid carrying tubes carrying pressurized fluid, the bar gun assembly comprising:
    a handle adapted to receive a multiplicity of fluids in a multiplicity of inlet ports, the handle including a multiplicity of fluid channels having a multiplicity of cylindrical fluid chambers, the fluid chambers having an inlet and an outlet port, cylindrical valve stem chamber walls, including valve stem chamber side walls and end walls, stem guide walls, valve body walls, and valve seats, the valve seats located between the inlet and outlet fluid ports;
    a multiplicity of valve members each having a valve stem and a valve body, the valve stem having a removed end, the valve members configured to move as a unit and to engage the fluid chambers of the handle and to longitudinally move between a first position wherein the valve body is urged against the valve seat and prevents fluid flow between the ports and a second position wherein the valve body is longitudinally spaced apart from the valve seat and permits flow between the ports; and an O-ring adapted to engage the fluid chamber walls and the valve stem to substantially prevent the flow of fluid therepast regardless of the position of the valve members;
  wherein the valve stem includes an O-ring retainer to move longitudinally with the valve stem and valve body;
  wherein the O-ring retainer is located between the removed end of the valve stem and the valve body, wherein the O-ring retainer is located between a closer of the inlet or outlet port and the removed end of the valve stem when the valve member is in the first position, and wherein the O-ring retainer has outer perimeter walls, which walls terminate before reaching the walls of the fluid chamber; and
  wherein the O-ring retainer leaves a gap between itself and the O-ring when the O-ring is seated adjacent the valve stem chamber end walls and the valve member is in the first position.

20. A bar gun assembly for receiving a multiplicity of fluid carrying tubes carrying pressurized fluid, the bar gun assembly comprising:
  a handle adapted to receive a multiplicity of fluids in a multiplicity of inlet ports, the handle including a multiplicity of fluid channels having a multiplicity of cylindrical fluid chambers, the fluid chambers having an inlet and an outlet port, cylindrical valve stem chamber walls, including valve stem chamber side walls and end walls, stem guide walls, valve body walls, and valve seats, the valve seats located between the inlet and outlet fluid ports;
  a multiplicity of valve members each having a valve stem and a valve body, the valve stem having a removed end, the valve members configured to move as a unit and to engage the fluid chambers of the handle and to longitudinally move between a first position wherein the valve body is urged against the valve seat and prevents fluid flow between the ports and a second position wherein the valve body is longitudinally spaced apart from the valve seat and permits flow between the ports;
  an O-ring adapted to engage the fluid chamber walls and the valve stem to substantially prevent the flow of fluid therepast regardless of the position of the valve members; and
  wherein the valve stem includes an O-ring retainer to move longitudinally with the valve stem and valve body;
  wherein the O-ring retainer is located between the removed end of the valve stem and the valve body, wherein the O-ring retainer is located between a closer of the inlet or outlet port and the removed end of the valve stem when the valve member is in the first position, and wherein the O-ring retainer has outer perimeter walls, which walls terminate before reaching the walls of the fluid chamber;
  wherein the valve stem comprises an elongated cylindrical member and wherein the O-ring retainer is a disk-shaped projection; and
  wherein the O-ring retainer leaves a gap between itself and the O-ring when the O-ring is seated adjacent the valve stem chamber end walls and the valve member is in the first position.

21. A bar gun assembly for receiving a multiplicity of fluid carrying tubes carrying pressurized fluid, the bar gun assembly comprising:
  a handle adapted to receive a multiplicity of fluids in a multiplicity of inlet ports, the handle including a multiplicity of fluid channels having a multiplicity of cylindrical fluid chambers, the fluid chambers having an inlet and an outlet port, cylindrical valve stem chamber walls, including valve stem chamber side walls and end walls, stem guide walls, valve body walls, and valve seats, the valve seats located between the inlet and outlet fluid ports;
  a multiplicity of valve members each having a valve stem and a valve body, the valve stem having a removed end, the valve members configured to move as a unit and to engage the fluid chambers of the handle and to longitudinally move between a first position wherein the valve body is urged against the valve seat and prevents fluid flow between the ports and a second position wherein the valve body is longitudinally spaced apart from the valve seat and permits flow between the ports;
  an O-ring adapted to engage the fluid chamber walls and the valve stem to substantially prevent the flow of fluid therepast regardless of the position of the valve members; and
  wherein the valve stem includes an O-ring retainer to move longitudinally with the valve stem and valve body;
  wherein the O-ring retainer is located between the removed end of the valve stem and the valve body, wherein the O-ring retainer is located between a closer of the inlet or outlet port and the removed end of the valve stem when the valve member is in the first position, and wherein the O-ring retainer has outer perimeter walls, which walls terminate before reaching the walls of the fluid chamber;
  wherein the O-ring retainer includes multiple fingers; and
  wherein the O-ring retainer leaves a gap when the O-ring is seated adjacent the valve stem chamber end walls and the valve member is in the first position.

22. A bar gun assembly for receiving a multiplicity of fluid carrying tubes carrying pressurized fluid, the bar gun assembly comprising:
  a handle adapted to receive a multiplicity of fluids in a multiplicity of inlet ports, the handle including a multiplicity of fluid channels having a multiplicity of cylindrical fluid chambers, the fluid chambers having an inlet and an outlet port, cylindrical valve stem chamber walls, including valve stem chamber side walls and end walls, stem guide walls, valve body walls, and valve seats, the valve seats located between the inlet and outlet fluid ports;
  a multiplicity of valve members each having a valve stem and a valve body, the valve stem having a removed end, the valve members configured to move as a unit and to engage the fluid chambers of the handle and to longitudinally move between a first position wherein the valve body is urged against the valve seat and prevents fluid flow between the ports and a second position wherein the valve body is longitudinally spaced apart from the valve seat and permits flow between the ports;
  an O-ring adapted to engage the fluid chamber walls and the valve stem to substantially prevent the flow of fluid therepast regardless of the position of the valve members; and
  wherein the valve stem includes an O-ring retainer to move longitudinally with the valve stem and valve body;
  wherein the O-ring retainer is located between the removed end of the valve stem and the valve body, wherein the O-ring retainer is located between a closer of the inlet or outlet port and the removed end of the valve stem when the valve member is in the first position, wherein the O-ring retainer has perimeter walls, which walls terminate before reaching the walls of the fluid chamber; and wherein the O-ring retainer leaves a gap when the O-ring is seated adjacent the valve stem chamber end walls and the valve member is in the first position.

* * * * *